United States Patent
Yang

(10) Patent No.: US 6,751,090 B1
(45) Date of Patent: Jun. 15, 2004

(54) ROTATABLE DISPLAY FIXING MODULE

(75) Inventor: Kuo-Chang Yang, Hsinchu (TW)

(73) Assignee: Quanta Computer Inc., Taoyuan Shien (TW)

( * ) Notice: Subject to any disclaimer, the term of this patent is extended or adjusted under 35 U.S.C. 154(b) by 0 days.

(21) Appl. No.: 10/446,073

(22) Filed: May 28, 2003

(30) Foreign Application Priority Data

Jan. 16, 2003 (TW) .................................. 092200810 U

(51) Int. Cl.$^7$ ................................................ G06F 1/16
(52) U.S. Cl. ........................ 361/681; 312/223.1; 349/58
(58) Field of Search ................................ 361/679–687, 361/724–727; 312/223.1–223.6; 345/169, 905; 248/917–926; 174/52.1, 52.3, 65 R; 349/58, 60, 65; 364/708.1

(56) References Cited

U.S. PATENT DOCUMENTS 6,275,376 B1 * 8/2001 Moon .......................... 361/683
6,498,721 B1 * 12/2002 Kim ............................ 361/681
6,532,152 B1 * 3/2003 White et al. ................. 361/692
2003/0048600 A1 * 3/2003 Hsu et al. .................... 361/683

* cited by examiner

Primary Examiner—Hung Van Duong
(74) Attorney, Agent, or Firm—Rabin & Berdo, P.C.

(57) ABSTRACT

A rotatable display fixing module is described. The rotatable display fixing module has a first rotational device, a second rotational device and a fixing switch. The first rotational device rotatable connects with a display and the second rotational device. The fixing switch rebounds up to fix the second rotational device at predetermined angles and then the display can rotate with the first rotational device only. The module further comprises a locking device to lock the fixing switch when the fixing switch is pressed down. A linkage device can release the fixing switch from the locking device at the predetermined angles and then the fixing switch rebounds up due to a spring device.

20 Claims, 4 Drawing Sheets

ROTATABLE DISPLAY FIXING MODULE

FIELD OF THE INVENTION

The present invention relates to a rotatable display fixing module and especially to a rotatable display fixing module for a notebook computer.

BACKGROUND OF THE INVENTION

Recently, liquid crystal displays (LCD) have been widely applied in electrical products, due to the rapid progress of optical technology and semiconductor technology. Moreover, with the advantages of high image quality, compact size, light weight, low driving voltage, and low power consumption, LCDs have been introduced into portable computers, personal digital assistants, color televisions, and are gradually replacing the cathode ray tubes (CRT) used in conventional displays. LCDs are becoming the mainstream display apparatus.

A conventional display of a notebook computer is disposed in the upper cover of the notebook computer. The display shows information and images thereon when the upper cover of the notebook computer is opened. The upper cover and a base of the notebook computer are connected by a pivot. Therefore, the working angle of the display can be adjusted according to user requirements by way of adjusting an angle of the upper cover.

Notebook computers are convenient to carry and therefore are frequently used for business meetings. In different environments, the notebook computer has to provide different display angles to enhance demonstration capabilities thereof. However, due to a conventional restricted display angle, the notebook computer cannot provide a clear image to all viewers. Moreover, due to software and hardware improvement, a tablet personal computer (Tablet PC) combines the notebook computer with a hand writing input device on the display. The tablet PC changes the input habits of the computer user and advances the information industry to a new milestone. A dual-purpose tablet PC with high processing performance combines the hand writing input device on the display panel and the keyboard input of the notebook computer. The dual-purpose tablet PC provides a humanizing input interface for a user who usually works in a moving environment. The display of a dual-purpose tablet PC can rotate about 180 degrees so that viewers around the tablet PC can easy see the information and images on the display.

Because the display is able to rotate, and is not fixed, the display can shake when the tablet PC is working so that the display is in an unstable working situation. Furthermore, because the rotatable display is usually rotated around a rotating mechanism, there is a concave hole around the rotating mechanisms to provide room for the rotating mechanism to move. Therefore, the user may directly see the concave hole under the rotatable display when the display of the dual-purpose tablet PC is opened. The concave hole may appear unattractive and further allows foreign objects that drop into the concave hole to interfere with the rotation of the rotating mechanism and even to damage the rotating mechanism.

Therefore, there is a need to fix effectively the display on the dual-purpose tablet PC and cover the concave hole to provide an attractive appearance and a more stable working situation.

SUMMARY OF THE INVENTION

It is an object of the present invention to provide a rotatable display fixing module to fix the display after the display reaches a predetermined angle so as to reduce the shaking phenomenon when the display is in use.

It is another object of the present invention provides a fixing switch. The fixing switch can rebound to cover the concave hole around the rotating mechanism to prevent foreign object from dropping thereinto when the display reaches the predetermined angle.

To accomplish the above objectives, the present invention provides a rotatable display fixing module. The rotatable display fixing module includes a first rotational device, a second rotational device and a fixing switch. The first rotational device rotatably connects a display to the second rotational device. Therefore, the display is capable of rotating on both the first rotational device and the second rotational device. The first rotational device is capable of rotating on the second rotational device. The fixing switch further includes a fixing surface. If the fixing switch rebounds to a rebound position, the fixing surface fixes the second rotational device at a predetermined angle and the display is still capable of rotating on the first rotational device.

The display is a liquid crystal display of a notebook computer. The fixing switch further includes a locking device that is disposed under the fixing switch. The locking device locks the fixing switch when the fixing switch is pressed down. A linkage device is utilized to link the fixing switch and the second rotational device. The locking device releases the fixing switch when the second rotational device reaches the predetermined angle and pushes the linkage device and then the linkage device pushes the locking device to release the fixing switch. The predetermined angle is the second rotational device at 0 degrees or 180 degrees.

Hence, the rotatable display fixing module according to the present invention locks the display to avoid turning to the left and right when the fixing switch rebounds up so that the shaking problem can be eliminated and the appearance can be attractive. Furthermore, the fixing switch can cover the concave hole to prevent the foreign objects from dropping into the concave hole so as to protect the rotating mechanism from damage. The display can fully rotate on the first and second rotational device when the fixing switch is pressed down.

BRIEF DESCRIPTION OF THE DRAWINGS

The foregoing aspects and many of the attendant advantages of this invention are more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1A:
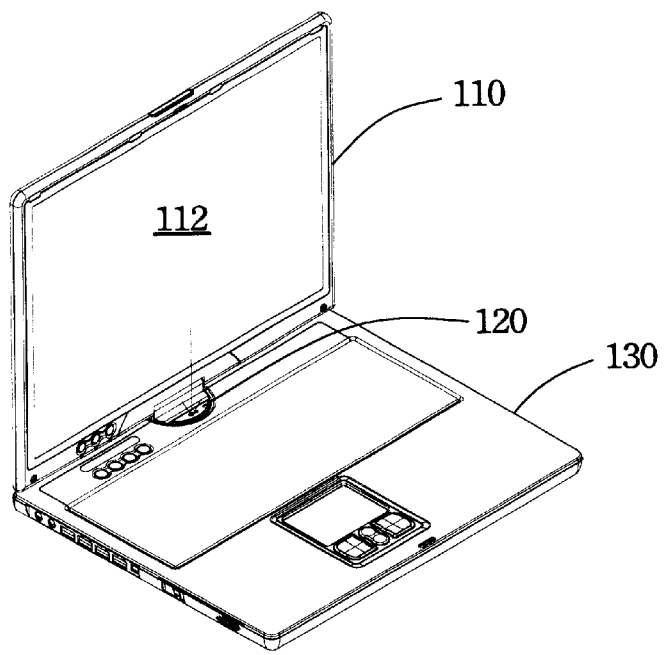
FIG. 1A is a schematic perspective view of a notebook computer having an opened display with a rotatable display fixing module of a preferred embodiment according to the present invention.
Figure 1B:
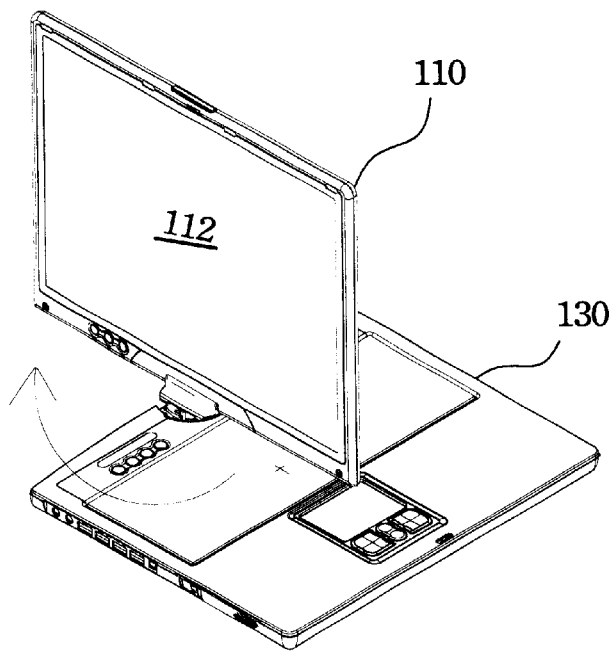
FIG. 1B is a schematic perspective view of the notebook computer display of FIG. 1A rotated 90 degrees.
Figure 1C:
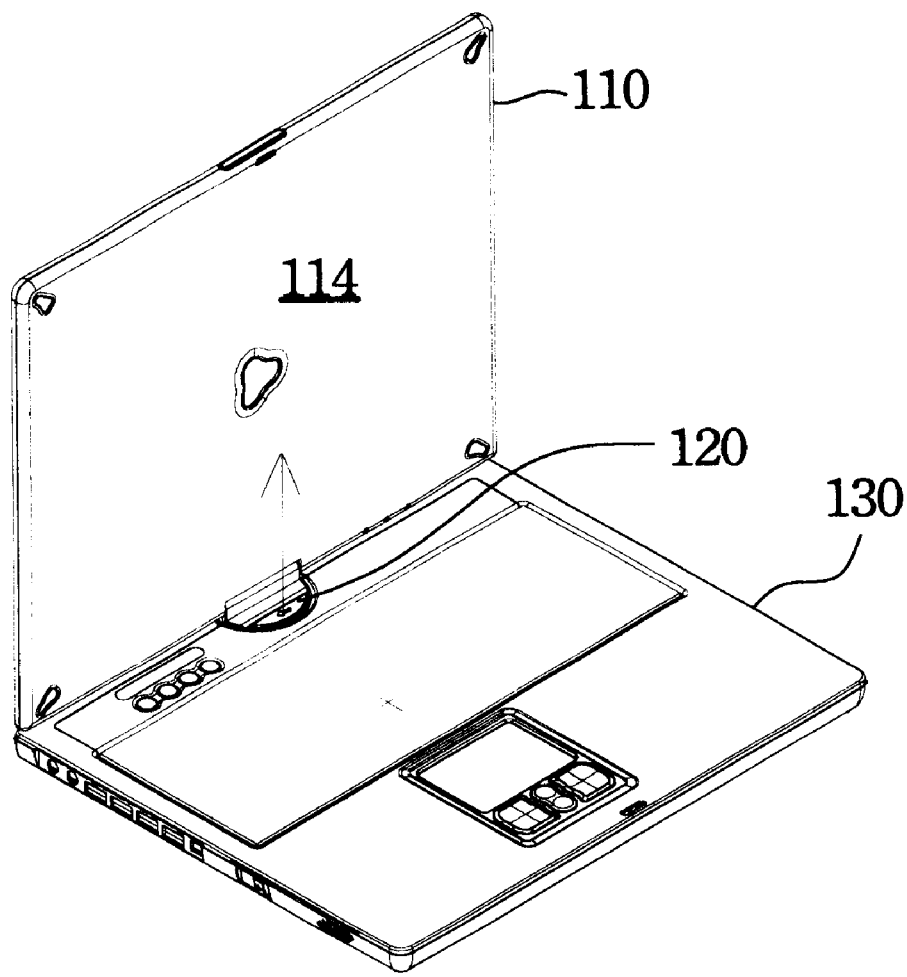
FIG. 1C is a schematic perspective view of the notebook computer display of FIG. 1A rotated 180 degrees.

FIG. 1A to FIG. 1C illustrate a display with a rotatable display fixing module of a preferred embodiment according to the present invention. FIG. 1A illustrates the display is just opened from a base of a notebook computer. FIG. 1B illustrates the display rotated about 90 degrees from the original position. FIG. 1C illustrates the display rotated about 180 degrees from the original position. Referring to FIGS. 1A to 1C, the notebook computer includes a display 110, a rotatable display fixing module 120, and a base 130. The display 110 further includes a display panel 112 on the front side of the display 110 and a display back cover 114 on the rear side thereof. The display 110 can be directly opened and the working angle thereof adjusted, similar to a conventional display of a notebook computer.

In FIG. 1B, the display 110 is rotated 90 degrees from the original position, and therefore the display panel 112 faces the left (or right) of the drawing. In FIG. 1C, the display 110 is further rotated 90 degrees again and therefore the display panel 112 faces the backside of the notebook computer and the display back cover 114 faces the inner side of the notebook computer. Hence, the notebook computer with the rotatable display fixing module 120 can allow viewers standing on the rear side of the notebook computer to see the information and images on the display panel 112 while a user is using a mouse and a keyboard to operate the notebook computer.

The display 110 can open up and down and further rotate 180 degrees clockwise or counterclockwise; that is to say, the display 110 turns right or left 180 degrees. Therefore, after the display 110 rotates 180 degrees, the display 110 can be closed on the base 130, and then the notebook computer becomes a tablet PC.

Figure 2:
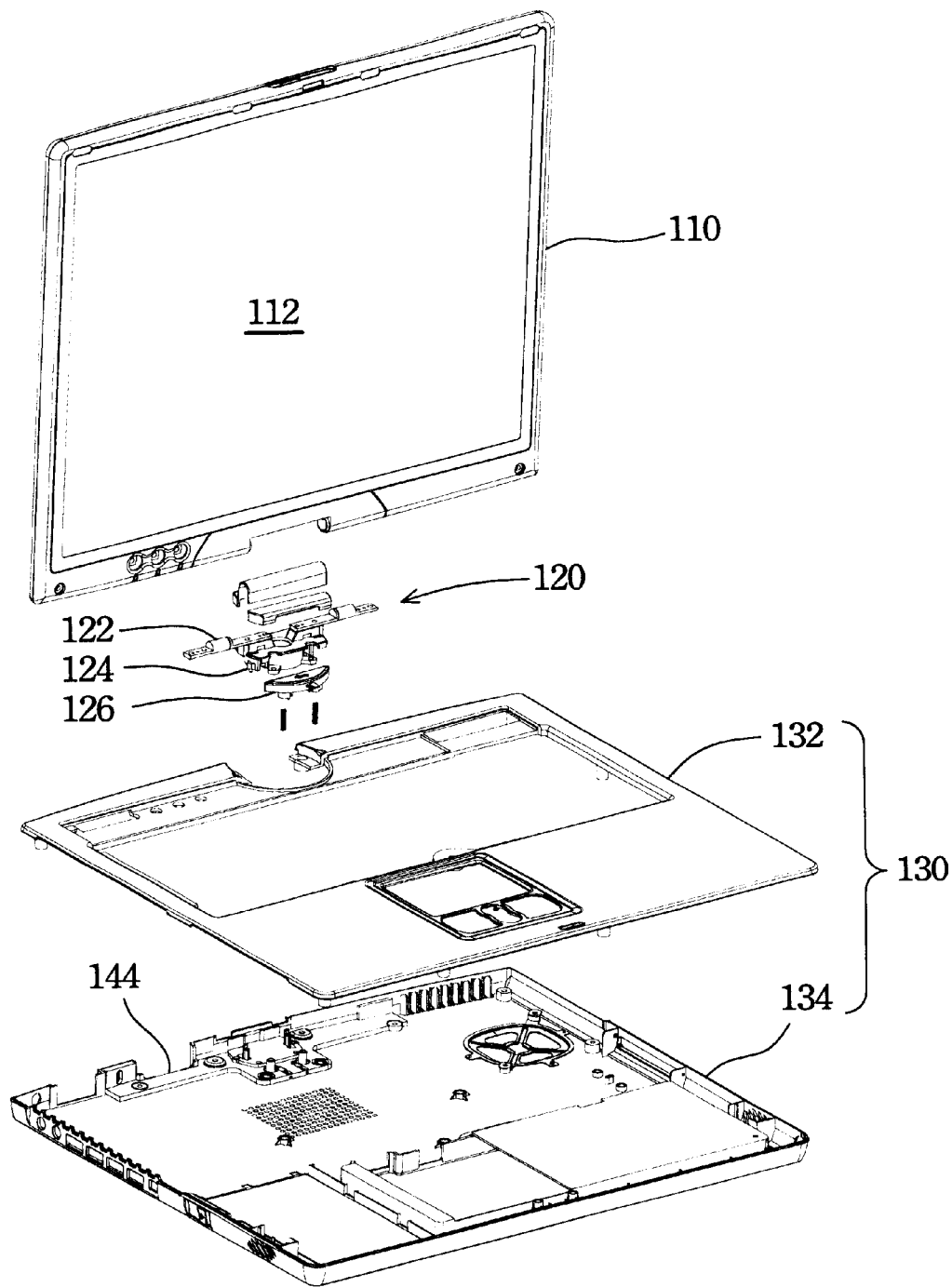
FIG. 2 is an exploded view of the notebook computer of FIG. 1A.

FIG. 2 is an exploded view of the notebook computer of FIG. 1A to illustrate the detailed connections of the notebook computer and the rotatable display fixing module 120. Referring to FIG. 2, the display 110 connects to the rotatable display fixing module 120 and the rotatable display fixing module 120 further connects to the base 130. The rotatable display fixing module 120 includes a first rotational device 122, a second rotational device 124, a fixing switch 126 and a fixing base 144. The first rotational device 122 and the second rotational device 124 enable the display 110 rotating up-down and left-right, respectively. The fixing switch 126 further provides a fixing function when the display 110 is at 0 degrees and 180 degrees. Therefore, the shaking phenomenon of the display 110 is eliminated when the display 110 is working at 0 degrees or 180 degrees. The fixing base 144 fixes on a base bottom cover 134 of the base 130 and is disposed between the base bottom cover 134 and a base top cover 132 of the base 130. Therefore, the base top cover 132 has to include a concave hole to provide room for the rotatable display fixing module 120 to rotate in the base 130.

Figure 3:
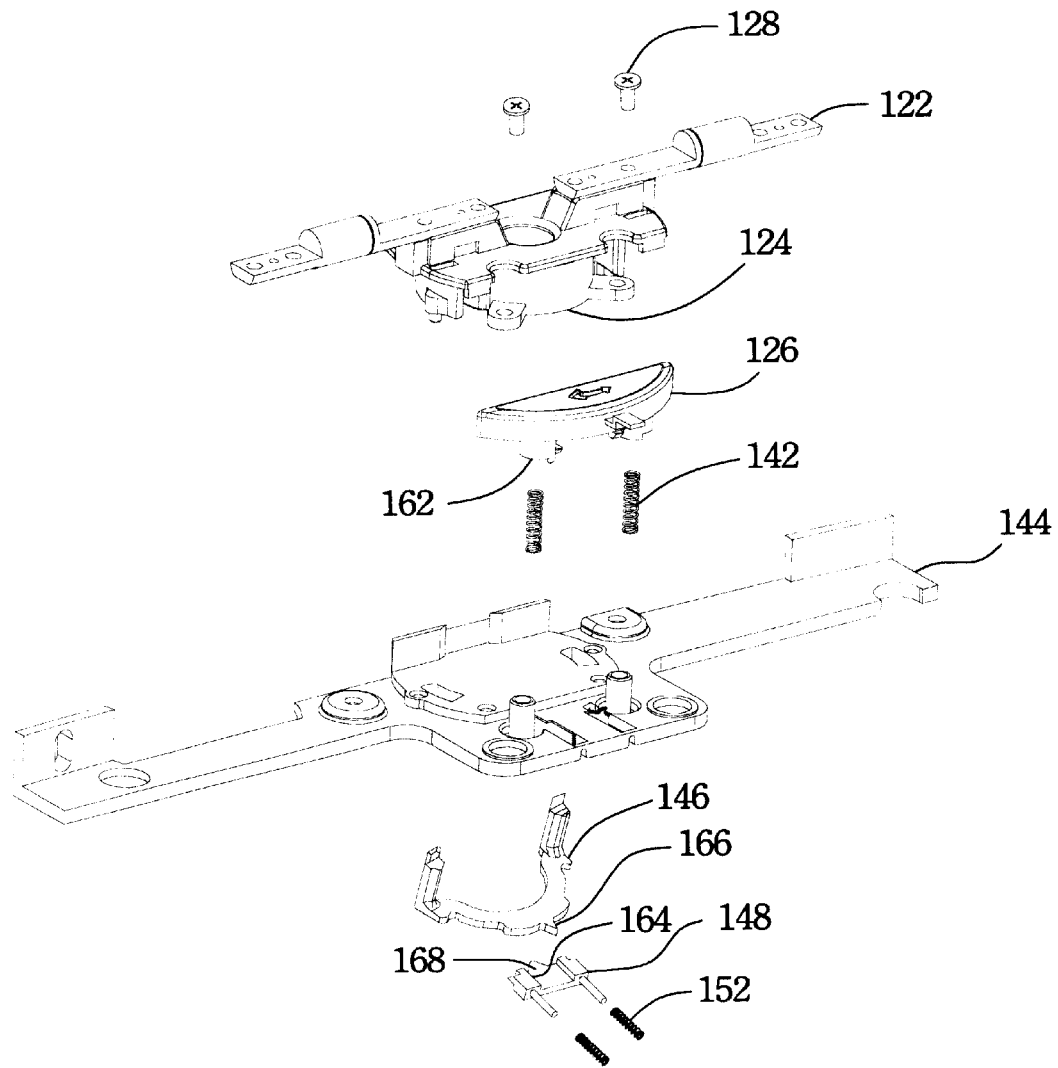
FIG. 3 is a detailed exploded view of the rotatable display fixing module according to the present invention.

FIG. 3 is a detailed exploded view of the rotatable display fixing module according to the present invention. The detailed operation procedure of the rotatable display fixing module 120 according to the present invention is illustrated with reference to FIG. 3. The rotatable display fixing module 120 includes the first rotational device 122, the second rotational device 124, the fixing switch 126 and the fixing base 144. The first rotational device 122 connects to the display 110 and the display 110 can rotate up-down with the first rotational device 122. The second rotational device 124 is fixed on the fixing base 144 with fixing devices 128. Therefore, the second rotational device 124 couples with the fixing base 144 and the fixing base 144 further couples with the base of the notebook computer. The second rotational device 124 further rotatably couples with the first rotational device 122 and therefore the first rotational device 122 can rotate with the second rotational device 124 in a clockwise or counterclockwise direction.

Hence, the rotatable display fixing module according to the present invention can provide a notebook computer capable of rotating up-down and left-right. For eliminating the display shaking problem when the notebook is working, the rotatable display fixing module 120 according to the present invention further utilizes a fixing surface on the fixing switch 126 to fix the second rotational device 124.

Referring to FIG. 1A again, the fixing switch 126 contacts and fixes a rotational element of the second rotational device 124 when the fixing switch 126 is at a rebound position, such as when the display 110 is at 0 degrees and the fixing switch 126 rebounds to the rebound position. Therefore, the fixing switch 126 fixes the rotational element of the second rotational device 124 at 0 degrees so that the shaking problem of the display 110 can be effectively eliminated.

Referring to FIG. 1C again, the fixing switch 126 contacts and fixes a rotational element of the second rotational device 124 when the fixing switch 126 is also at the rebound position, such as when the display 110 is at 180 degrees. Therefore, the fixing switch 126 fixes the rotational element of the second rotational device 124 at 180 degrees so that the shaking problem of the display 110 can be effectively eliminated.

The user only needs to press the fixing switch 126 into the concave hole on the base 130 when the user wants to rotate the display 110. While the fixing switch 126 maintains the lower position, the display 110 can easily rotate in clockwise and counterclockwise directions. Because the fixing switch 126 includes a flange 162 on the bottom side, the fixing switch 126 passes through the fixing base 144 and is locked by a hook 164 of a locking device 148 when the fixing switch 126 is pressed down. Therefore, the fixing switch 126 remains in the lower position and the display 110 can easily rotate over the fixing switch 126.

When the display 110 arrives at 0 or 180 degrees of rotation, a linkage device 146 is triggered. A thorn 166 of the linkage device 146 touches a thorn 168 of locking device 148 to push the locking device 148 moving a predetermined distance, and then the hook 164 releases the flange 162 of the fixing switch 126. The fixing switch 126 rebounds to the rebound position via the spring force of spring devices 142. Therefore, the fixing switch 126 fixes the second rotational device 124 and the display 110 shaking problem is eliminated. The locking device 148 is pushed a predetermined distance and rebounded to the original position via the spring force of spring devices 152 to wait until the fixing switch 126 is pressed again.

When a conventional dual-purpose tablet PC can provide a display with clockwise and counterclockwise rotation, the base thereof usually has to include a concave hole for the rotating mechanism. But the concave hole can appear unattractive and the rotating mechanism can be damaged by foreign object dropped into the concave hole. The display with the rotatable display fixing module according to the present invention provides the fixing switch with rebounding ability to fix the display and protect the concave hole from foreign objects. The present invention further provides an attractive appearance for the dual-purpose tablet PC. The present invention can be used not only with a notebook computer but also with any electric appliance with a flat display.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A rotatable display fixing module comprising:
    a first rotational device rotatable connecting to a display so as to allow the display rotating with the first rotational device;
    a second rotational device rotatable connecting to the first rotational device so as to allow the first rotational device rotating with the second rotational device, and the display rotating with the first rotational device and the second rotational device; and
    a fixing switch, wherein when the fixing switch rebounds, the fixing switch fixes the second rotational device at a predetermined angle and the display is still capable of rotating with the first rotational device.

2. The rotatable display fixing module of claim 1, wherein the display comprises a liquid crystal display.

3. The rotatable display fixing module of claim 1, wherein the fixing switch further comprises a locking device under the fixing switch to lock the fixing switch when the fixing switch is pressed down.

4. The rotatable display fixing module of claim 3, wherein the locking device further comprises a linkage device, wherein when the second rotational device reaches the predetermined angle, the second rotational device pushes the linkage device and the linkage device pushes the locking device to release the fixing switch.

5. The rotatable display fixing module of claim 4, wherein the fixing switch further comprises a spring device to rebound the fixing switch when the fixing switch is released by the locking device.

6. The rotatable display fixing module of claim 1, wherein the predetermined angle is the second rotational device at 0 degrees.

7. The rotatable display fixing module of claim 1, wherein the predetermined angle is the second rotational device at 180 degrees.

8. The rotatable display fixing module of claim 1, wherein the fixing switch fixes a rotational element of the second rotational device when the fixing switch rebounds and the display is therefore capable of rotating on the first rotational device only.

9. The rotatable display fixing module of claim 1, wherein the display is capable of rotating with the first rotational device and the second rotational device when the fixing switch is pressed down.

10. A rotatable display fixing module for a notebook computer, the rotatable display fixing module comprising:
    a first rotational device rotatable connecting to a liquid crystal display of the notebook computer so as to allow the liquid crystal display rotating with the first rotational device;
    a second rotational device rotatable connecting with the first rotational device so as to allow the first rotational device rotating with the second rotational device, and the liquid crystal display rotating with the first rotational device and the second rotational device;
    a fixing switch, wherein when the fixing switch rebounds, the fixing switch fixes the second rotational device at a predetermined angle and the liquid crystal display is still capable of rotating with the first rotational device; and
    a locking device disposed under the fixing switch for locking the fixing switch when the fixing switch is pressed down.

11. The liquid crystal rotatable display fixing module of claim 10, wherein the locking device further comprises a linkage device, wherein when the second rotational device reaches the predetermined angle, the second rotational device pushes the linkage device and the linkage device pushes the locking device to release the fixing switch.

12. The liquid crystal rotatable display fixing module of claim 11, wherein the fixing switch further comprises a spring device to rebound the fixing switch when the fixing switch is released by the locking device.

13. The liquid crystal rotatable display fixing module of claim 10, wherein the predetermined angle is the second rotational device at 0 degrees.

14. The liquid crystal rotatable display fixing module of claim 10, wherein the predetermined angle is the second rotational device at 180 degrees.

15. The liquid crystal rotatable display fixing module of claim 10, wherein the fixing switch fixes a rotational element of the second rotational device when the fixing switch rebounds, and the liquid crystal display is therefore capable of rotating on the first rotational device only.

16. The liquid crystal rotatable display fixing module of claim 10, wherein the liquid crystal display is capable of rotating on the first rotational device and the second rotational device when the fixing switch is pressed down.

17. A notebook computer comprising:
    a liquid crystal display;
    a base; and
    a rotatable display fixing module coupling with the liquid crystal display and the base, wherein the rotatable display fixing module further comprises:
        a first rotational device rotatable connecting to the liquid crystal display so as to allow the liquid crystal display rotating with the first rotational device;
        a second rotational device rotatable connecting with the first rotational device so as to allow the first rotational device rotating with the second rotational device, and the liquid crystal display rotating with the first rotational device and the second rotational device;
        a fixing base coupling the second rotational device to the base;
        a fixing switch, wherein when the fixing switch rebounds, the fixing switch fixes the second rotational device at a predetermined angle and the liquid crystal display is still capable of rotating with the first rotational device;
        a locking device disposing under the fixing switch for locking the fixing switch when the fixing switch is pressed down;
        a linkage device, wherein when the second rotational device reaches the predetermined angle, the second rotational device pushes the linkage device and the linkage device pushes the locking device to release the fixing switch; and
        a spring device rebounding the fixing switch when the fixing switch releases from the locking device.

18. The notebook computer of claim 17, wherein the predetermined angle is the second rotational device at 0 degrees.

19. The notebook computer of claim 17, wherein the predetermined angle is the second rotational device at 180 degrees.

20. The notebook computer of claim 17, wherein the fixing switch fixes a rotational element of the second rotational device, the liquid crystal display is capable of rotating with the first rotational device only while the fixing switch rebounds, and the liquid crystal display is capable of rotating with the first rotational device and the second rotational device while the fixing switch is pressed down.

* * * * *